C. S. COUCH.
FLOUR SIFTER.
APPLICATION FILED DEC. 27, 1916.
1,248,081.
Patented Nov. 27, 1917.
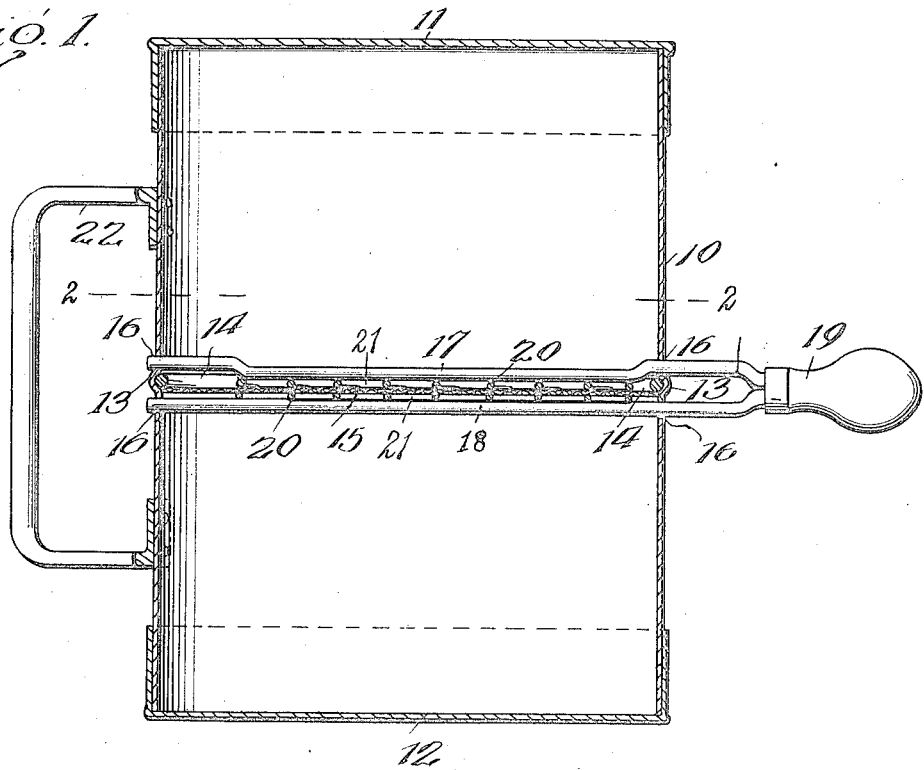
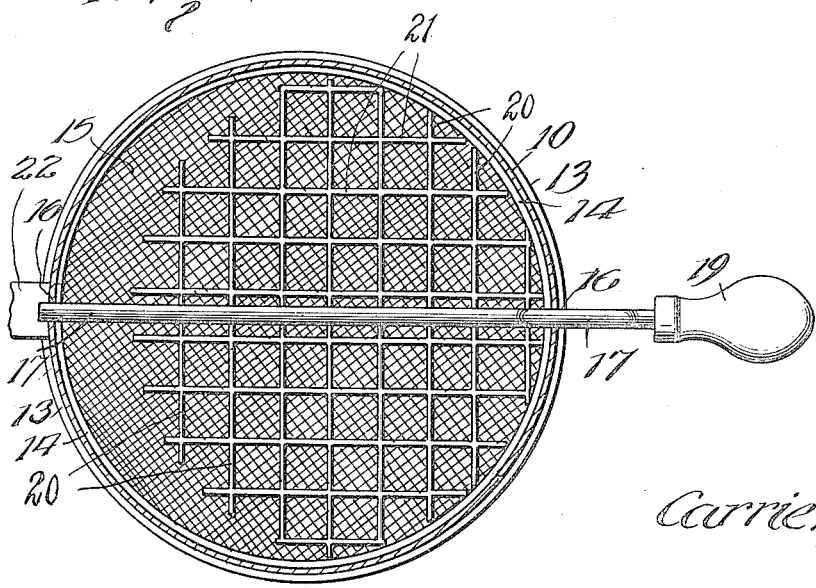
Inventor
Carrie S. Couch
By _____, Attorneys

UNITED STATES PATENT OFFICE.

CARRIE S. COUCH, OF SENECA, ILLINOIS.

FLOUR-SIFTER.

1,248,081. Specification of Letters Patent. Patented Nov. 27, 1917.

Application filed December 27, 1916. Serial No. 139,152.

*To all whom it may concern:*

Be it known that I, CARRIE S. COUCH, a citizen of the United States, residing at Seneca, in the county of La Salle and State of Illinois, have invented certain new and useful Improvements in Flour-Sifters, of which the following is a specification.

This invention relates to improvements in sifting devices, more particularly to devices of this character employed for sifting flour and the ingredients employed in connection therewith in baking cakes and the like, and has for one of its objects to improve the construction and increase the efficiency and utility of devices of this character.

Another object of the invention is to provide a device of this character wherein the materials or ingredients may be repeatedly sifted and mixed without removal from the device.

The improved device is particularly adapted for use when it is desired to dry out and fluff flour and to integrally mix baking powder and other ingredients without the necessity of removing the materials from the sifter between each operation.

With these and other objects in view, the invention consists in certain novel features of construction, as hereinafter shown and described and then specifically pointed out in the claims; and in the drawings illustrative of the preferred embodiment of the invention—

Figure 1 is a longitudinal sectional view of the improved device.

Fig. 2 is a plan view with the receiver for the materials in section on the line 2—2 of Fig. 1.

Corresponding and like parts are referred to in the following description and indicated in all the views of the drawings by the same reference characters.

The improved device comprises a receiver 10, preferably cylindrical, open at the ends and provided with closures 11—12. Formed around the shell 10 intermediate the ends is a bead 13 to form a seat for a band wire 14 to which screen material 15 is attached, the member 14 being supported by springing into the channel formed by the bead. Formed through the walls of the member 10 at opposite sides thereof and at opposite sides of the screen are guideways 16 through which supporting members 17—18 are slidably disposed. The members 17—18 are of greater length than the diameter of the receiver 10 and are united at one end in a handle 19. By this means the united members 17—18 may be moved backwardly and forwardly through the guideway 16. The wires of the screen 15 are arranged obliquely to the paths of the members 17—18 as illustrated in Fig. 2. Attached to the contiguous faces of the members 17—18 are a plurality of bars 20 spaced at uniform distances, the bars being directed at right-angles to the supporting members and obliquely to the wires of the screen 15. Attached to the bars 20 are a plurality of other bars 21 uniformly spaced and extending in parallel relation to the members 17—18, and at right-angles to the bars 20, as shown in Fig. 2. The bars 20—21 thus extend continuously oblique to the wires of the screen. The bars 20—21 are rigidly connected to each other at their crossing points, and the total area of the bars is less than the total area of the interior of the member 10, so that the united bars will move over a considerable portion of the screen material when the handle 19 is actuated. The screen material 15 is attached to the member 14 at one side, and the member 17 is preferably curved toward the screen, as shown in Fig. 1 so that the bars 20—21, which are associated with the member 17 operate relatively close to the adjacent face of the screen. By this arrangement the united bars operate in relatively close proximity to the screen material at opposite sides thereof. A handle 22 is attached to the member 10, preferably at the side opposite to the handle 19. By this arrangement it will be obvious that flour and the various ingredients employed in making cake and the like may be placed in the receiver 10 at one side of the screen and the agitator, and the covers 11—12 applied. Then by holding the device by the handle 22 and reciprocating the handle 19 the bars 20—21 will be caused to travel over the screen obliquely to the wires and sift the materials through the screen into the lower portion of the receiver, and at the same time thoroughly mix the various ingredients.

The receiver is then reversed in position and the operation repeated, and so on as often as required.

The bars 20—21 by crossing each other at right-angles and moving over the wires which constitute the screen in an oblique direction, thoroughly mix the ingredients and pulverize and disintegrate any lumps or particles too large to pass through the meshes of the screen.

The operation may be carried on indefinitely until the required sifting is effected. It will be noted that the reciprocating members are supported at opposite points in the wall of the container and are thereby held against lateral oscillation so that the agitating members or rods 20 and 21 will be prevented from moving otherwise than in the prescribed path. It will also be noted that the member 17 is slightly bent near each end so as to provide shoulders which constitute stops so that by their engagement with the walls of the container, the movement of the agitator will be limited and the ends of the agitator bars 20—21 will be prevented from impinging against the container wall with such force as to punch holes therein. The said member 17 may be easily threaded through the openings when assembling the device but after the parts are all assembled and the device is in use the agitator will not readily slip out of place.

Having thus described the invention, what is claimed as new is—

In a device of the class described, a container, a band supported within the container between the ends thereof, a foraminous sheet secured at its periphery to one side of the band, the wall of the container being formed at diametrically opposite points with openings located at the opposite sides of the said band, and an agitator including spaced members slidably fitted through the said openings with one member extending at one side of the said band and the other member extending at the other side of the band, that one of the said members which is located next adjacent the side of the band to which the foraminous sheet is secured being straight and the other member having its intermediate portion deflected in the direction of the said sheet to provide a portion lying within the band and close to the said sheet and the ends of which portion are arranged, in the reciprocatory motion of the agitator to strike against the band whereby to limit the said motion of the agitator, and means carried by each of said members contacting the respective side of the said sheet.

In testimony whereof I affix my signature.

CARRIE S. COUCH. [L. S.]